N. HALL.
GEAR REDUCTION AND LOCK FOR STEERING APPARATUS.
APPLICATION FILED OCT. 8, 1919.

1,339,454.

Patented May 11, 1920.
2 SHEETS—SHEET 1.

Inventor
Nelson Hall,
By
Attorneys

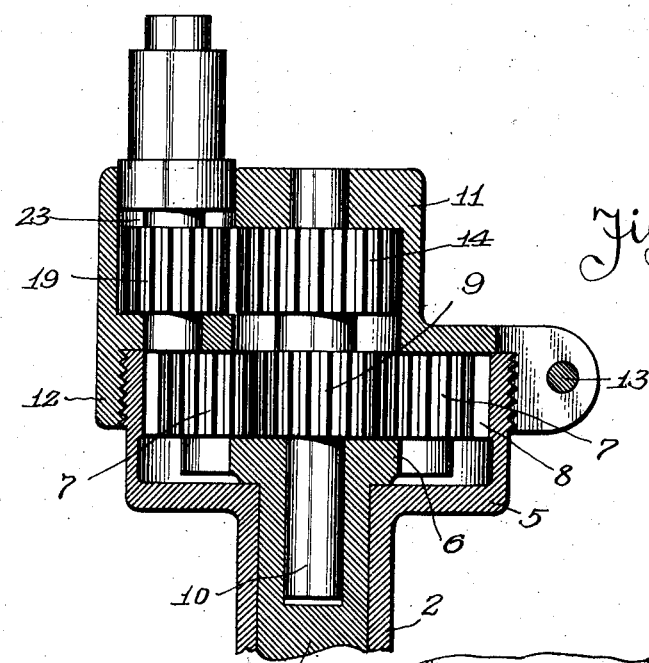
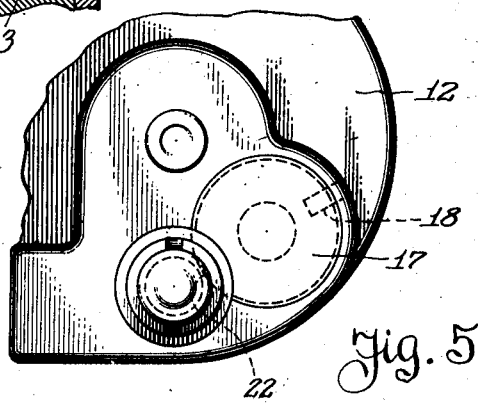
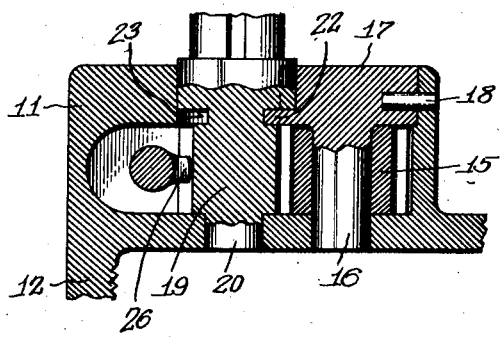

UNITED STATES PATENT OFFICE.

NELSON HALL, OF DETROIT, MICHIGAN, ASSIGNOR OF ONE-HALF TO ALFRED CANT, OF DETROIT, MICHIGAN.

GEAR REDUCTION AND LOCK FOR STEERING APPARATUS.

1,339,454.   Specification of Letters Patent.   Patented May 11, 1920.

Application filed October 8, 1919. Serial No. 329,387.

*To all whom it may concern:*

Be it known that I, NELSON HALL, a citizen of the United States of America, residing at Detroit, in the county of Wayne and State of Michigan, have invented certain new and useful Improvements in Gear Reduction and Locks for Steering Apparatus, of which the following is a specification, reference being had therein to the accompanying drawings.

This invention relates to an automobile locking device that is applicable to the steering column or post assembly of an automobile by making a slight change in the present construction of a steering column. A great many automobiles have a steering column composed of an outer stationary casing containing a rotatable shaft and on the upper end of the shaft is a spider associated with planetary gearing so that a steering wheel axially of the shaft may impart movement thereto. The planetary gearing includes a central gear and a short shaft, and in order to install my locking device it is only necessary to substitute a longer shaft for the short shaft and provide another cap for the upper end of the stationary casing.

My locking device is characterized by a train of gears associated with the usual train of gears and the train of gears permits of a steering wheel being offset relative to the steering shaft, and it is optional with the user of the automobile as to which side of the steering shaft the steering wheel is placed.

The locking device is further characterized by a simple form of lock adapted to engage a gear and prevent its rotation, and the lock may also be placed for the convenience of the driver or operator of the automobile.

A simple, durable and inexpensive construction enters into my locking device and this construction will be hereinafter specifically described and then claimed.

Reference will now be had to the drawings, wherein—

Fig. 3 is a vertical sectional view taken on the line III—III of Fig. 1;

Fig. 4 is a cross sectional view taken on the line IV—IV of Fig. 1, and

Fig. 5 is a plan of a portion of the locking device.

Figure 1:
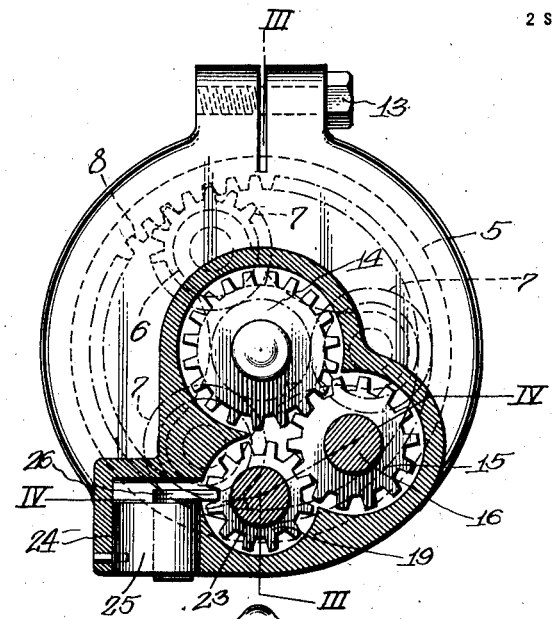
Figure 1 is a plan of the steering column assembly showing the locking mechanism in a horizontal section.
Figure 2:
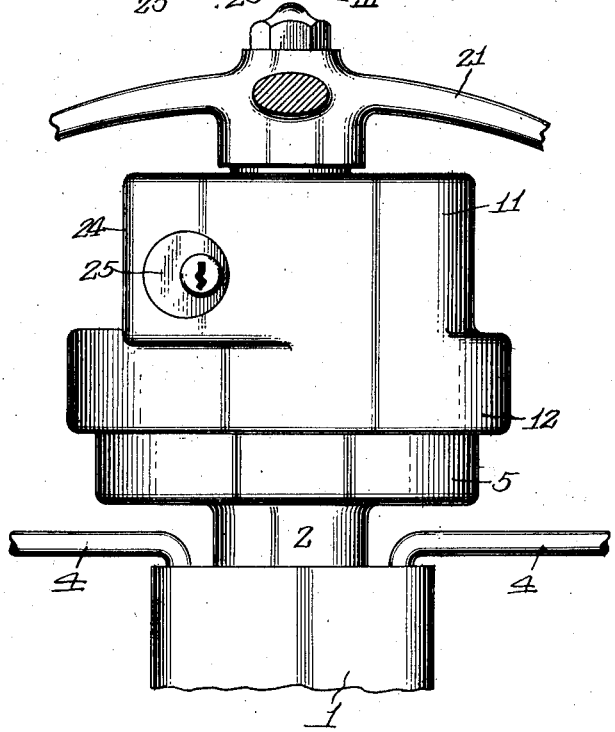
Fig. 2 is a front elevation of a locking device in connection with a portion of a steering column.

In the drawings the reference numeral 1 denotes the usual shell which surrounds the outer stationary casing 2 of a rotatable steering shaft 3 which is journaled in said casing and together with the casing protrudes from the upper end of the shell 1 and provides sufficient clearance for the ignition and throttle control levers 4 of the steering column assembly.

The upper end of the casing 2 terminates in a housing 5 and on the upper end of the shaft 3, within the housing 5, is a spider 6 supporting a plurality of planetary gears 7 meshing with an internal rack 8 of the housing 5 and with a central gear 9 mounted on a shaft 10 loose in the upper end of the shaft 3. Ordinarily the shaft 10 is short and supports a steering wheel by which movement is imparted to the steering shaft 3 through the planetary gearing.

In order that my locking device may be installed I substitute a long shaft for the usual short shaft and as shown in Fig. 3 the shaft 10 is of sufficient length to have the upper end thereof journaled in an enlargement 11 of a cap 12 screwed on the housing 5 and clamped thereon, as at 13. On the upper end of the shaft 10, within the enlargement 11, is a gear 14 meshing with a gear 15 loose on a post 16 set in the enlargement 11, said post having a head 17 held by a pin 18 or other fastening means, so that the post 16 cannot rotate or become vertically displaced.

The loose gear 15 meshes with a gear 19 fixed on a steering wheel shaft 20 journaled in the enlargement 11 and having its upper end provided with the usual steering wheel 21. The gear 19 has been shown as formed integral with the shaft 20 and said shaft is retained within the enlargement 11 by a lateral flange 22 of the post head 17 extending into an annular groove 23 of the steering wheel shaft 20. It is therefore possible to remove the pin 18 and bodily lift the post 16 and the shaft 20 from the enlargement 11 of the cap 12.

The enlargement 11 has an offset portion 24 and fixed in this offset portion is a conventional form of lock 25 adapted to be key operated, said lock having its barrel provided with a crank or arm 26 which may be swung into and out of engagement with the gear 19. As shown in Fig. 1 the crank or arm 26 extends between teeth of the gear 19 and prevents rotation of the steering wheel shaft 20 and the other gears operatively associated therewith.

By reference to Fig. 3 it will be noted that the steering wheel shaft is offset relative to the steering shaft 3 and by releasing the clamp of the cap 12 said cap may be rotated to position the steering wheel at either side of the axis of the steering shaft 3 for the convenience of the operator or driver of the automobile. When the steering wheel is turned the superposed sets of gears impart movement to the steering shaft 3 and when it is desired to lock the steering gears it is only necessary to key operate the lock 25. Then an automobile cannot be steered, and it is believed that such a locking device will materially reduce the theft of automobiles and similar vehicles.

My additions to the usual steering column assembly can be finished to harmonize with the remainder of the column and while in the drawing there is illustrated a preferred embodiment of my invention, it is to be understood that the structural elements are susceptible to such variations and modifications as fall within the scope of the appended claims.

What I claim is:

1. In a steering column assembly, a steering shaft, an offset steering wheel, gears adapted to transmit movement to said steering shaft from said steering wheel, and means adapted to lock said gears against movement by said steering wheel.

2. A steering column assembly as characterized in claim 1, wherein means incloses some of said gears and is capable of adjustment to position the off-set steering wheel at either side of the axis of said steering shaft.

3. In a steering column assembly, a steering shaft, a steering wheel, superposed sets of gears adapted to transmit movement from said steering wheel to said steering shaft, and means adapted to lock the uppermost set of gears against movement by said steering wheel.

4. A steering column assembly as characterized in claim 3, wherein a cap incloses the sets of gears and is capable of adjustment to position the steering wheel at either side of the axis of the steering shaft.

5. The combination with planetary gears adapted to impart movement to a steering shaft, and a steering wheel, of a train of gears interposed between said steering wheel and said planetary gears so that said steering wheel may operate said steering shaft, and a locking device for said train of gears.

6. The combination set forth in claim 5, wherein the steering wheel is offset relative to the steering shaft.

7. The combination set forth in claims 5 and 6, wherein an adjustable cap incloses the train of gears and permits of the steering wheel being set at either side of the axis of the steering shaft.

In testimony whereof I affix my signature in the presence of two witnesses.

NELSON HALL.

Witnesses:
ANNA M. DORR,
KARL H. BUTLER.